United States Patent
Kunisada

(10) Patent No.: US 9,783,256 B2
(45) Date of Patent: Oct. 10, 2017

(54) HEAT-SHIELDING STRUCTURE FOR PERIPHERY OF IGNITION SWITCH

(71) Applicant: Kawasaki Jukogyo Kabushiki Kaisha, Kobe-shi, Hyogo (JP)

(72) Inventor: Youhei Kunisada, Kobe (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 0 days.

(21) Appl. No.: 14/949,573

(22) Filed: Nov. 23, 2015

(65) Prior Publication Data

US 2016/0075392 A1    Mar. 17, 2016

Related U.S. Application Data

(63) Continuation of application No. PCT/JP2014/061900, filed on Apr. 28, 2014.

(30) Foreign Application Priority Data

May 28, 2013 (JP) ................................ 2013-111700

(51) Int. Cl.
  *B62J 23/00* (2006.01)
  *B62K 11/04* (2006.01)
  *F02B 61/02* (2006.01)
  *F02B 77/11* (2006.01)

(52) U.S. Cl.
  CPC ............... *B62J 23/00* (2013.01); *B62K 11/04* (2013.01); *F02B 61/02* (2013.01); *F02B 77/11* (2013.01)

(58) Field of Classification Search
  CPC B62J 23/00; B62K 11/04; F02B 61/02; F02B 77/11

USPC ........................................................ 180/219
See application file for complete search history.

(56) References Cited

U.S. PATENT DOCUMENTS 3,709,317 A    1/1973  Ingham
2014/0116794 A1    5/2014  Kawai

FOREIGN PATENT DOCUMENTS

| CN | 101913389 | 12/2010 |
| JP | 58-068485 | 5/1983 |
| JP | 60-111023 | 7/1985 |
| JP | 60111023 U * | 7/1985 |
| JP | 63-112292 | 5/1988 |
| JP | 10-129555 | 5/1998 |
| JP | 2010-129555 | 5/1998 |
| JP | 10129555 A * | 5/1998 |

(Continued)

OTHER PUBLICATIONS

English Translation of the International Preliminary Report on Patentability and Written Opinion of the International Searching Authority mailed Dec. 10, 2015 for International PCT Patent Application No. PCT/JP2014/061900, filed Apr. 28, 2014 (12 pages).

(Continued)

*Primary Examiner* — Jacob Knutson
*Assistant Examiner* — Felicia L Brittman

(57) ABSTRACT

The heat shielding structure includes a cowling for covering an outer side of at least a front portion of a combustion engine of a motorcycle and an ignition switch is disposed above a combustion engine and in the vicinity of the rear of a head pipe. A first heat shielding member covers at least rear and opposite side faces of the ignition switch to shield the heat raising from the combustion engine.

6 Claims, 6 Drawing Sheets

(56) References Cited

FOREIGN PATENT DOCUMENTS

| JP | 2011-139380 | 5/1999 |
| JP | 2008-213541 | 9/2007 |
| JP | 2009-073287 | 4/2009 |
| JP | 2011-063195 | 3/2011 |
| WO | WO2013/001712 | 1/2013 |

OTHER PUBLICATIONS

Notification of Reason(s) for Rejection Issued Nov. 1, 2016 for Corresponding Japanese Patent Application No. 2013-111700 and English Language Summary (5 pages).
International Search Report for PCT/JP2014/061900, filed Apr. 28, 2014.
Extended and Supplementary Search Report Issued Feb. 15, 2017 for Corresponding European Patent Application No. 14803467.1 (7 pages).
First Office Action Issued Apr. 24, 2017 for Corresponding Chinese Patent Application No. 201480030347.9 with English language translation of the Search Report attached to the Office Action (8 pages).

\* cited by examiner

HEAT-SHIELDING STRUCTURE FOR PERIPHERY OF IGNITION SWITCH

CROSS REFERENCE TO THE RELATED APPLICATION

This application is a continuation application, under 35 U.S.C §111(a) of international application No. PCT/JP2014/061900, filed Apr. 28, 2014, which claims priority to Japanese patent application No. 2013-111700, filed May 28, 2013, the entire disclosure of which is herein incorporated by reference as a part of this application.

BACKGROUND OF THE INVENTION

Field of the Invention

The present invention relates to an improvement in and of a heat shielding structure in the neighborhood of an ignition switch in a motorcycle.

Description of Related Art

Hitherto, arrangement has been employed in which an ignition switch in a motorcycle is disposed in the rearward neighborhood of a head pipe. In such case, the ignition switch comes to be positioned above a combustion engine. In this respect, see the patent document 1 listed below. When a cowling is mounted on such a motorcycle, as a result that dissipation of heat generated by the combustion engine is hampered by the cowling, a major quantity of the heat flows upwardly.

PRIOR ART LITERATURE

Patent Document 1: JP Laid-open Patent Publication No. S63-112292

Accordingly, if the ignition switch is disposed above the combustion engine, the ignition switch is exposed to the heat.

SUMMARY OF THE INVENTION

In view of the foregoing, the present invention has for its object to provide a structure that inexpensively enables a heat shielding in the neighborhood of the ignition switch by adding a simple structure.

In order to accomplish the foregoing object, the present invention provides a heat shielding structure around an ignition switch, which includes: a cowling to cover an outer side of at least a front portion of a combustion engine of a motorcycle; an ignition switch disposed above the combustion engine and in the rearward neighborhood of a head pipe; and a first heat shielding member configured to cover at least a rear face and opposite side faces of the ignition switch to shield a heat raising upwardly from the combustion engine.

According to the present invention, even though, thanks to the use of the cowling, a substantial amount of heat emanating from the combustion engine raises, at least the rear and opposite side faces of the ignition switch tending to be exposed to the raising heat are protected by the first heat shielding member. Therefore, reduction in function brought about by the heating of the ignition switch to the elevated temperature is prevented.

In a preferred embodiment of the present invention, the ignition switch may be disposed above a main frame, in which case the main frame has a front portion to which the head pipe is connected, and a part of the first heat shielding member seals between the ignition switch and the main frame. According to this structural feature, with between the lower surface of the ignition switch and the upper surface of the main surface, the heating of the ignition switch to the elevated temperature consequent upon passage of the heat of the combustion engine therebetween can be avoided.

In another preferred embodiment of the present invention, the ignition switch may be disposed above the main frame, in which case the main frame has a front portion to which the head pipe is connected, and an air cleaner is provided rearwardly of the ignition switch. In such case, a gap between the ignition switch and the air cleaner and a gap between the main frame and the air cleaner may be covered by a second heat shielding member. According to this structural feature, the heat raising from the combustion engine and tending to flow from a lower surface of the air cleaner towards an ignition switch side can be inhibited by the second heat shielding member. Therefore, the heat shielding in the neighborhood of the ignition switch is further effectively accomplished.

In a further preferred embodiment of the present invention, a front portion of a side surface of the air cleaner may be covered by the cowling, in which case the second heat shielding member is interposed between the air cleaner and the cowling. According to this structural feature, the heat that emanates from the combustion engine and flows towards the neighborhood of the ignition switch around and from the gap between the cowling and the air cleaner can be effectively inhibited by the second heat shielding member.

In a still further preferred embodiment of the present invention, the first heat shielding member may be engaged in a recess defined in a front end portion of the second heat shielding member. According to this structural feature, since the positioning between the first heat shielding member and the second heat shielding member is accomplished accurately, the gap intervening therebetween can be eliminated. Therefore, the heat shielding effect in the vicinity of the ignition switch is further enhanced.

In a yet further preferred embodiment of the present invention, a sub intake port forming a part of an intake port may be provided in a front portion of the air cleaner so as to exposed to the outside, in which case the second heat shielding member is positioned above the sub intake port. According to this structural feature, the ingress of rain water into the sub intake port of the air cleaner can be avoided by the second heat shielding member.

In a still yet further preferred embodiment of the present invention, the first and second heat shielding member may be made of a sponge material. Since the sponge material is lightweight, it can be easily fitted to a predetermined side without giving an additional weight loading to the motorcycle.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
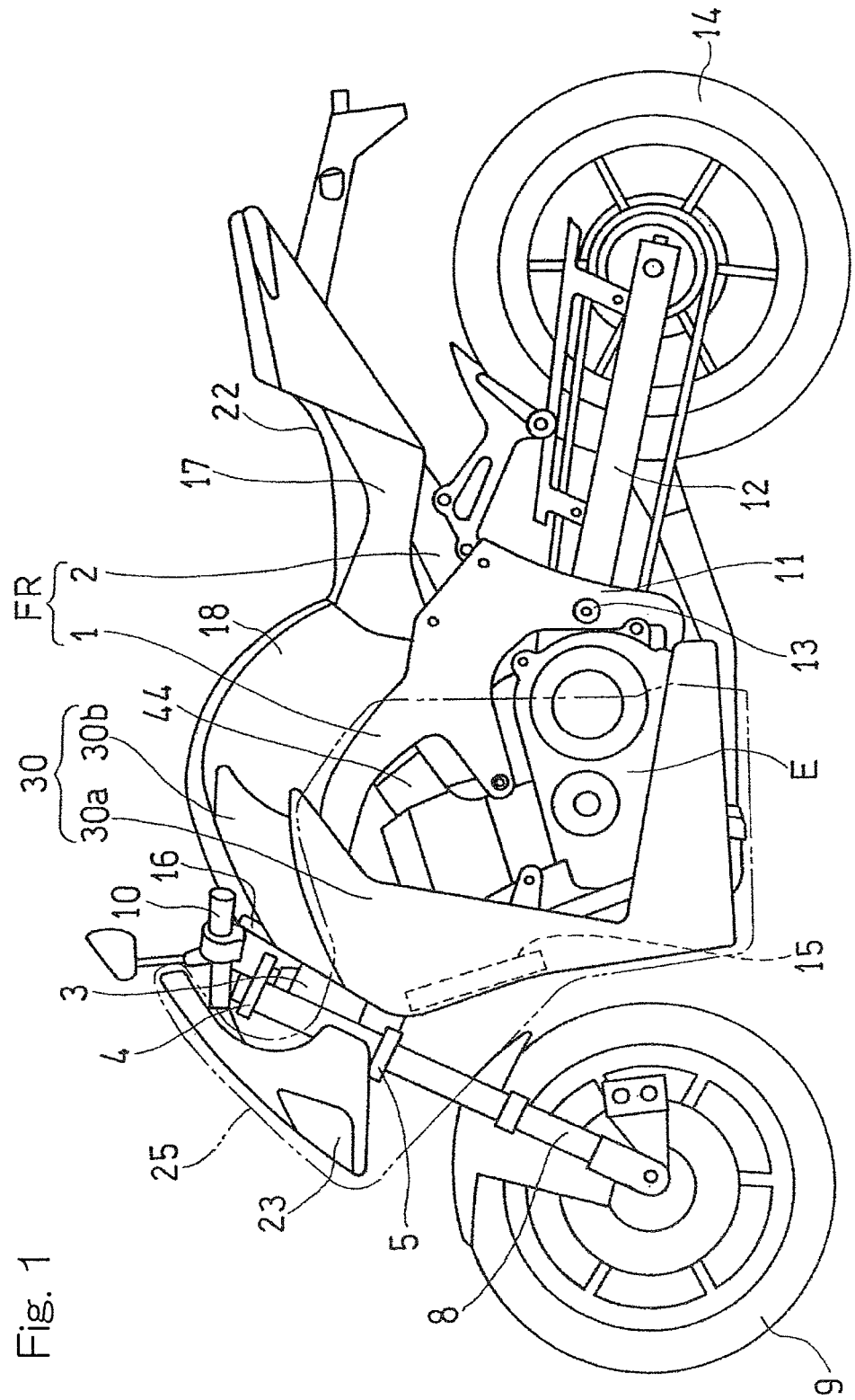
FIG. 1 is a schematic side view of a motorcycle having employed therein a heat shielding structure which is designed in accordance with a preferred embodiment of the present invention.

A preferred embodiment of the present invention will be hereinafter discussed in detail with particular reference to the accompanying drawings. In particular, FIG. 1 illustrates a schematic side view of a motorcycle embodying the preferred embodiment of the present invention. The illustrated motorcycle includes a vehicle body frame structure FR including a main frame 1, forming a front half portion thereof, and a rear frame 2 connected with a rear portion of the main frame 1 and forming a rear half portion of the vehicle frame structure FR. A head pipe 3 is fitted to a front end of the main frame 1, and an upper bracket 4 and an under bracket 5 are fitted to a steering shaft (not shown) that is rotatably inserted in the head pipe 3. A front fork 8 is supported by the upper bracket 4 and the under bracket 5 and a front wheel 9 is supported by at a lower end portion of the front fork 8. The upper bracket 4 at an upper end portion of the front fork 8 has a handlebar 10 fitted thereto.

The main frame 1 has a rear end portion provided with a swingarm bracket 11, and a swingarm 12 is supported by the swingarm bracket 11 for swinging movement up and down about a pivot pin 13 that is inserted in a front end portion thereof. This swingarm 12 has a rear end portion supporting a rear wheel 14. A combustion engine E is supported by a lower portion of the main frame 1, and this combustion engine E drives the rear wheel 14 through a transmission mechanism (not shown) such as, for example, a substantially endless chain. The combustion engine E employed in the practice of this embodiment is in the form of, for example, a water cooled multi-cylinder combustion engine and, therefore, a radiator 15 for dissipating heat of a cooling liquid is disposed forwardly of the combustion engine E.

A rider's seat 22 is supported on the rear frame 2, and a fuel tank 18 made of a metallic material is fitted on an upper portion of the main frame 1, that is, on a vehicle upper portion and between the handlebar 10 and the rider's seat 22. A region below a rear portion of the fuel tank 18 and, also, below the rider's seat 22 is covered by a side covering 17 from a lateral side A vehicle body front portion has mounted thereon a pair of left and right side fairing (cowling) 30, 30, made of a resinous material. The side fairing 30 includes a cowl main body 30a, covering a region from a lateral side of a front portion of the combustion engine E to a lateral side of a lower portion thereof, and a tank covering 30b connected with an upper portion of the cowl main body 30a and covering a front portion of the fuel tank 18 from a lateral side.

It is to be noted that in place of the side fairing 30, a large sized front cowl including a front cowl and a headlamp unit 23, as shown by the double dotted line, which is large enough to cover a region ranging from the front portion of the vehicle body to a lateral side of the combustion engine E, may be employed. The side fairing 30 and the front cowl 25 are a sort of cowling (those side and front cowls being collectively referred to as "cowling" or "fairing") and cover a lateral side of at least the front portion of the combustion engine E. Accordingly, heat evolved in the combustion engine E is rarely dissipated laterally and a major quantity of the heat is dissipated upwards.

Figure 2:
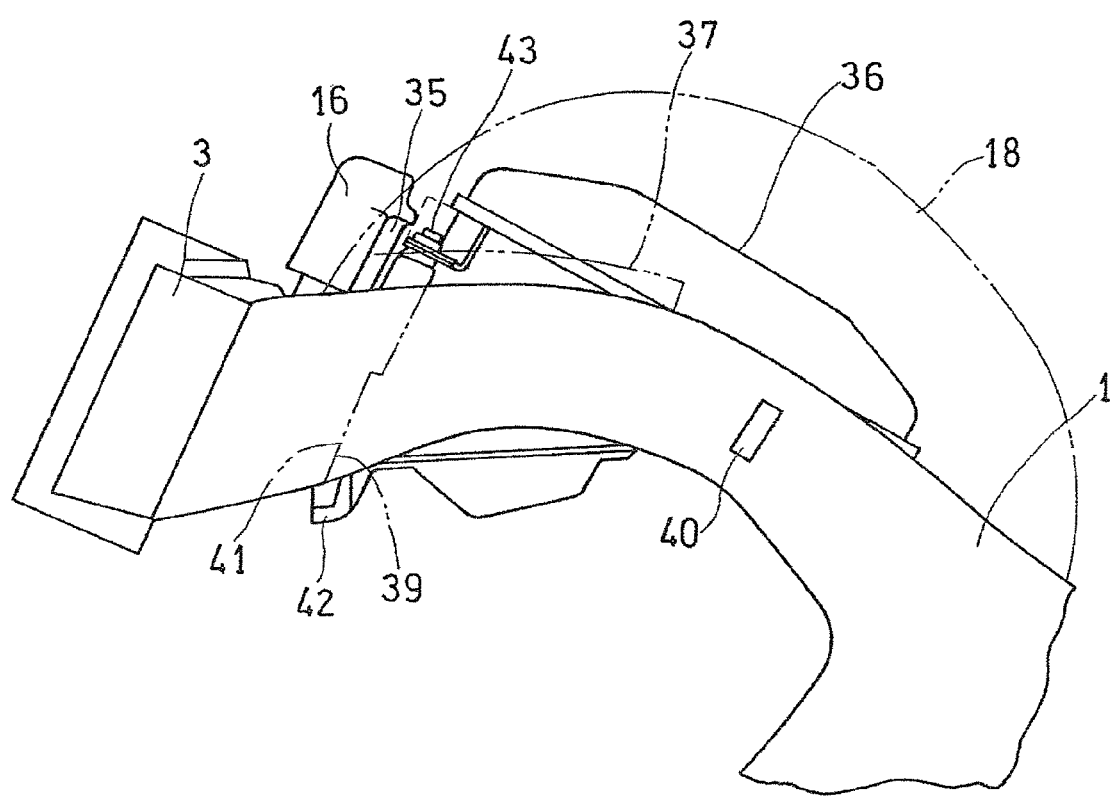
FIG. 2 is a schematic side view showing, on an enlarged scale, the neighborhood of the ignition switch.

The headlamp unit 23 referred to above is mounted on the upper bracket 4 and the under bracket 5. An ignition switch 16 is disposed intermediate between the head pipe 3 and the fuel tank 18, and an air cleaner 36 shown in FIG. 2 is disposed rearwardly of the ignition switch 16.

Figure 3:
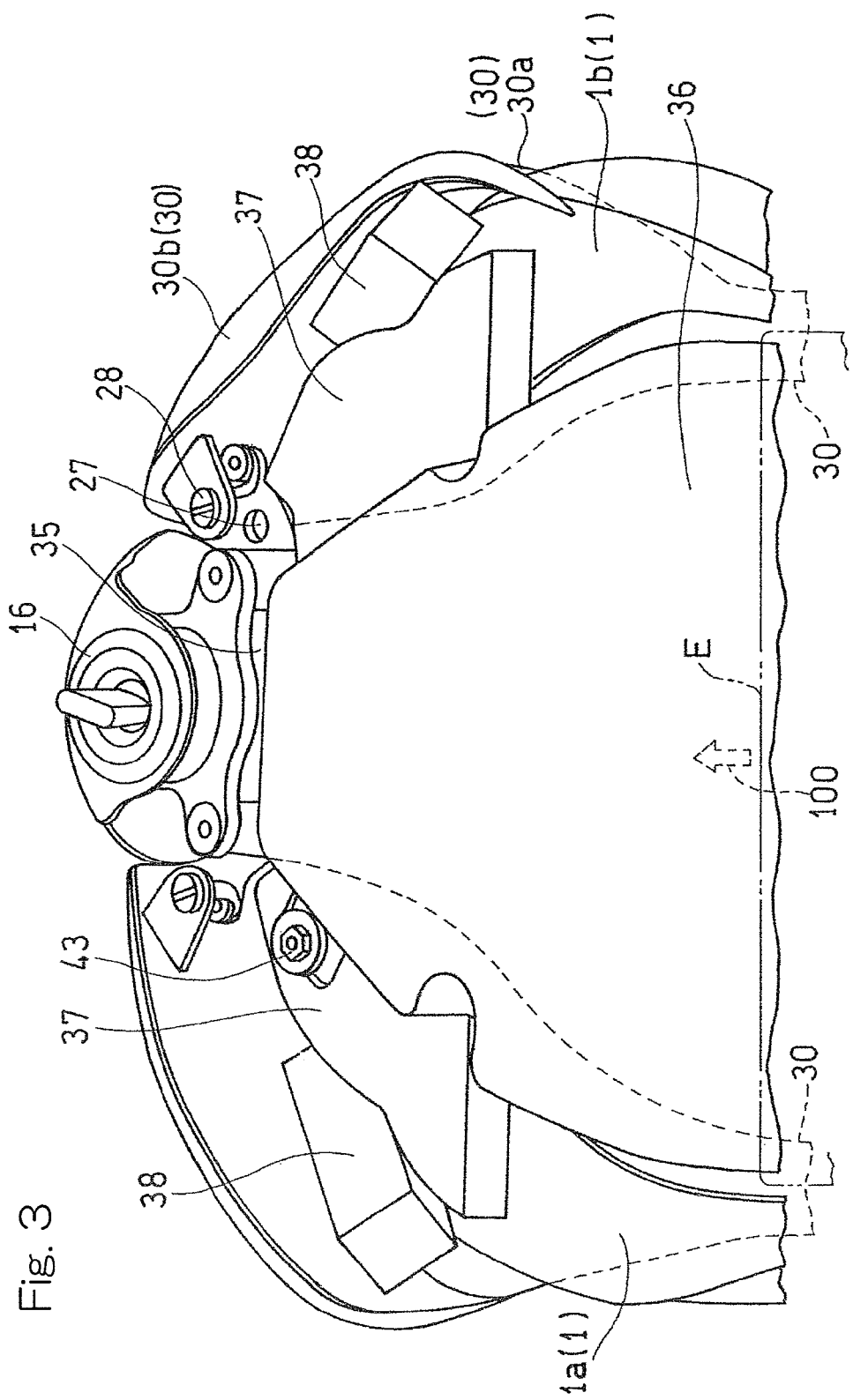
FIG. 3 is a perspective view showing the neighborhood of the ignition switch as viewed from above in a direction diagonally rearwardly thereof.

The ignition switch 16 is positioned in the vicinity of the rear of the head pipe 3, and the air cleaner 36 is positioned in the vicinity of the rear of the ignition switch 16. As shown in FIG. 3, the main frame 1 includes a pair of left and right main frame piece 1a and 1b, and the air cleaner 36 referred to above is disposed intermediate between those frame pieces 1a and 1b. The air cleaner 36 has a front portion supported by the main frame 1 by means of a connecting member 43 such as, for example, a bolt, and also has a rear portion supported by a throttle body 44 of the combustion engine E.

The ignition switch 16 is fixed to the main frame 1 by inserting a bolt (not shown) into a bolt insertion hole 27 and threading the bolt into a threaded hole defined in the main frame 1. The tank covering 30b forming an upper portion of the side fairing 30 is supported by the ignition switch 16 by means of a connecting member 28. The cowl main body 30a of the side fairing 30 is supported by the main frame 1 and the combustion engine E, both shown in FIG. 1.

As shown by the broken line in FIG. 3, a gap exists between the pair of the side fairings 30 and 30, and an incoming wind is introduced through this gap towards a front surface of the combustion engine E. The side fairing 30 covers a region forward of a side portion of the combustion engine E, a front portion of a side surface of the air cleaner 36 and a region below that front portion of the side surface of the air cleaner 36. Accordingly, a portion of the heat 100 emanating from the combustion engine E is prevented from flowing rearward by the side fairing 30 and, therefore, flows upwards from a side portion of the combustion engine E towards a side portion of the air cleaner 36.

A first heat shielding member 35 is mounted on the ignition switch 16 and, as will be described in detail later, the first heat shielding member 35 serves to accomplish heat shielding in the vicinity of the ignition switch 16. A gap between the ignition switch 16 and a front end portion of the air cleaner 36 and a gap between the front portion of the main frame 1 and a front portion side face of the air cleaner 36 are covered from above by a second heat shielding member 37. The second heat shielding member 37 is interposed between the air cleaner 36 and the side fairing 30, and seals a gap therebetween. A third heat shielding member 38 seals a gap between a rear outer portion of the second heat shielding member 37 and the side fairing 30. It is, however, to be noted that the use of this third heat shielding member 38 is not essential in the practice of the present invention and may therefore be dispensed with.

Figure 4:
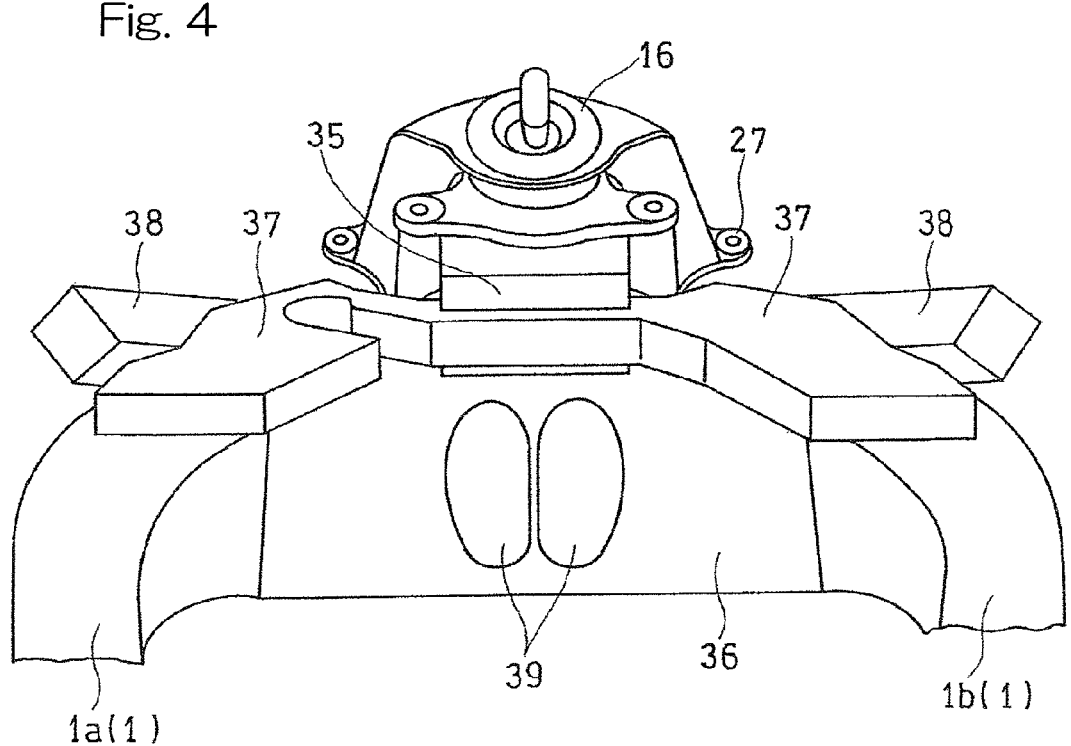
FIG. 4 is a schematic rear view showing the neighborhood of the ignition switch as viewed from rear.

FIG. 4 illustrates a rear view of the neighborhood of the ignition switch as viewed from rear. As shown in FIG. 4, the second heat shielding member 37 is fixed to respective upper surfaces of the main frame pieces 1a and 1b by means of a fixing unit such as, for example, a double sided adhesive tape or a bonding agent. This second heat shielding member 37 has a front end portion held in contact with a rear surface of the first heat shielding member 35. An intake air delivery port 39 opening rearwardly is formed in a vehicle widthwise direction intermediate portion of the front portion of the main frame 1, and an incoming wind, introduced through the intake air introducing port 40 (as shown in FIG. 2) opening, in an outer side face of the main frame 1, is guided towards the intake air delivery port 39 through an intake air passage defined in the interior of the main frame 1.

The air cleaner 36 shown in FIG. 2 has a main air intake port 41 fluidly connected with the intake air delivery port 39 in the main frame 1. In continuation with a lower portion of this main air intake port 41, a sub intake port 42 for sucking an additional air protrudes downwardly from the air cleaner 36 and is exposed to the outside. The main intake port 41 and the sub intake port 42 are positioned at a vehicle widthwise direction intermediate portion of the air cleaner 36.

Figure 5:
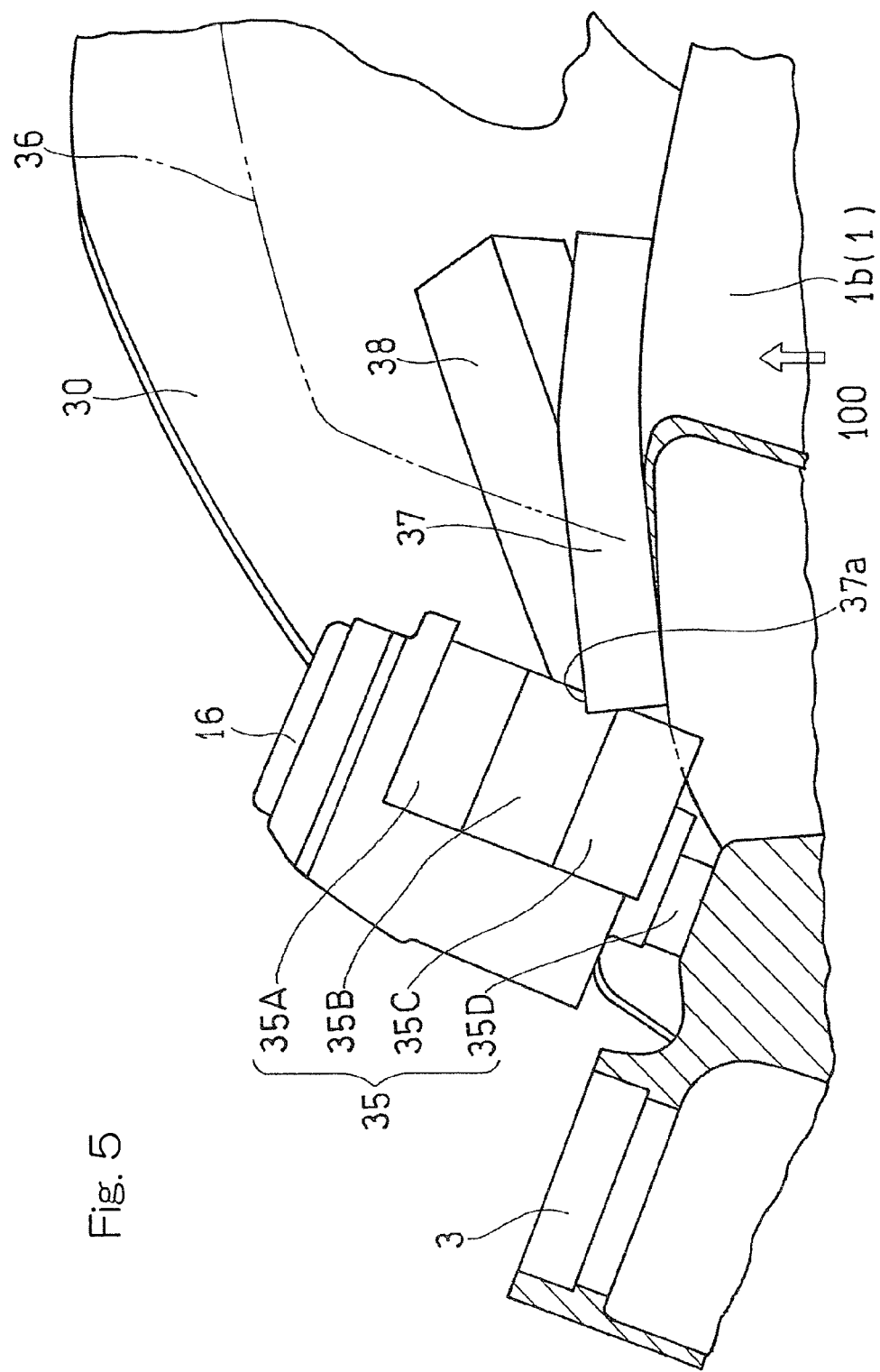
FIG. 5 is a schematic side view showing, on a further enlarged scale, showing the neighborhood of the ignition switch.

FIG. 5 illustrates a schematic side view showing, on an enlarged scale, the neighborhood of the ignition switch 16. As shown in FIG. 5, rear and side faces of the ignition switch 16 are covered by a major portion of the first heat shielding member 35, and a sealing piece 35D, which forms a part of the first heat shielding member 35, seals between a lower surface of the ignition switch 16 and an upper surface of the main frame 1. A gap between the ignition switch 16 and the air cleaner 36 and a gap between the main frame 1 and the air cleaner 36 are covered by the second heat shielding member 37.

Figure 6:
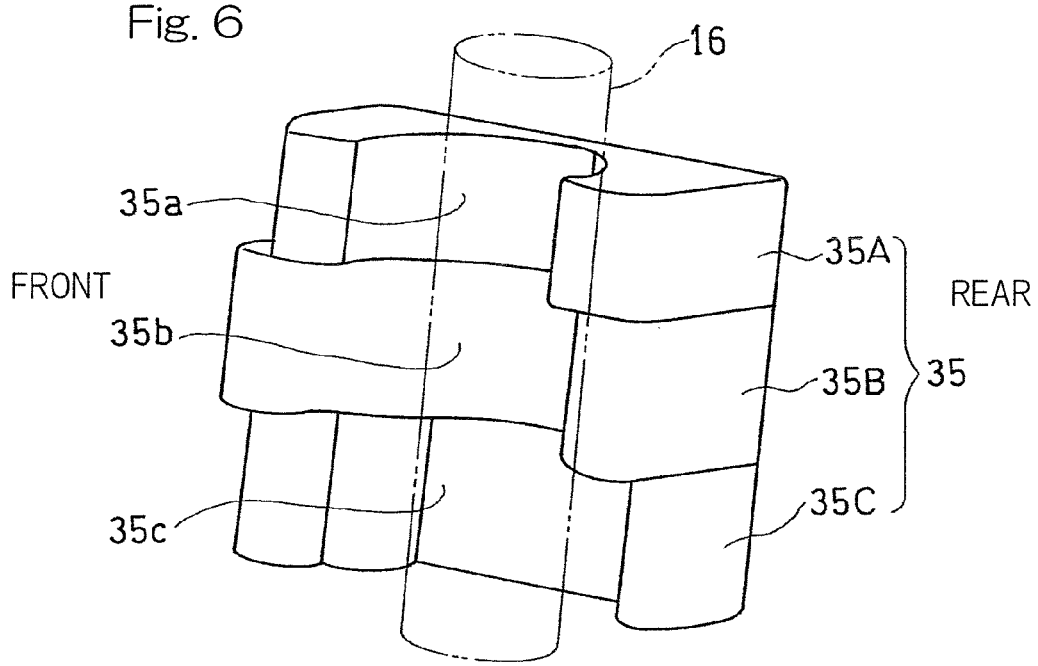
FIG. 6 is a perspective view showing a first heat shielding member.

As shown in FIG. 6, the first heat shielding member 35 referred to above includes three parts including member pieces 35A, 35B and 35C, and each of the member pieces 35A to 35C has an inner side formed with recesses 35a, 35b and 35c that cooperate with each other to accommodate the ignition switch 16. The ignition switch 16 is, as shown by the double dotted line, held by those recesses 35a, 35b and 35c with the rear and opposite side faces of such ignition switch 16 consequently covered thereby. It is to be noted that the first heat shielding member 35 may not be necessarily comprised of the three parts and may be comprised of one part, two parts or four or more parts. This first heat shielding member 35 is made of a resin-made, somewhat hard sponge material, and therefore, is lightweight and excellent in heat shielding property. However, it is noted that any other material, if having an equivalent function, may be used for the first heat shielding member 35.

Figure 7:
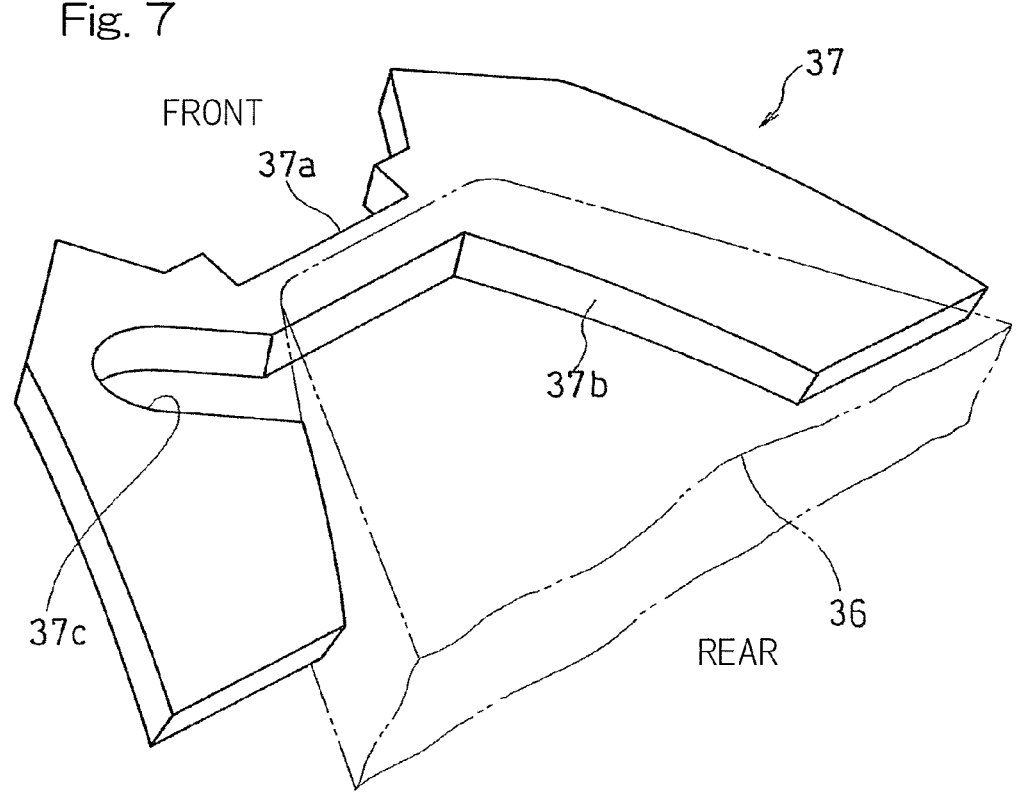
FIG. 7 s a perspective view showing a second heat shielding member.

As shown in FIG. 7, the second heat shielding member 37 is comprised of a single part. Specifically, the second heat shielding member 37 has a front portion formed with a recess 37a in which rear face and opposite side faces of the first heat shielding member 35 are engaged, and also has an inner surface of a rear portion formed with a recess 37b with which a front portion outer peripheral surface of the air cleaner 36 contacts. Also, the second heat shielding member 37 is formed with a recess 37c, as best shown in FIG. 7, which follows the shape of the connecting member 43 used to fix the air cleaner 36 to the main frame 1 shown in FIG. 3. Each of the second heat shielding member 37 and the third heat shielding member 38 is made of a material similar to that used to form the first heat shielding member 35. The second heat shielding member 37 may be fixed to the air cleaner 36, shown in FIG. 3, by means of a fixing unit such as, for example, a double sided adhesive tape or a bonding agent, and the third heat shielding member 38 may be fixed to the side fairing 30 by means of a similar fixing unit.

In the configuration described hereinabove, although thanks to the presence of the side fairing 30 as shown in FIG. 1 the substantial amount of heat evolved by the combustion engine E raises, at least the rear and opposite side faces of the ignition switch 16 shown in FIG. 5 are protected by the first heat shielding member 35, and therefore, reduction in function brought about by the heating of the ignition switch to the elevated temperature is prevented.

Also, the ignition switch 16 is disposed above the main frame 1 connected at its front with the head pipe 3, and the sealing piece 35D which forms a part of the first heat shielding member 35 seals between the ignition switch 16 and the main frame 1. Accordingly, heating of the ignition switch 16 to the elevated temperature as a result of passage of the heat 100 of the combustion engine E between the lower surface of the ignition switch 16 and the upper surface of the main frame 1 is avoided.

The air cleaner 36 is disposed rearwardly of the ignition switch 16 shown in FIG. 3, and the gap between the ignition switch 16 and the air cleaner 36 and the gap between the main frame 1 and the air cleaner 36 are covered by the second heat shielding member 37. Accordingly, the heat raising from the combustion engine E can be prevented, by the second heat shielding member 37, from flowing from the lower surface of the air cleaner 36 towards the ignition switch 16 side. Therefore, the heat shielding in the vicinity of the ignition switch 16 is further effectively accomplished.

Also, the front portion of the side surface of the air cleaner 36 is covered by the pair of the left and right side fairings 30 and 30, and the second heat shielding member 37 intervenes between the side fairing 30 and the air cleaner 36. Accordingly, the heat 10 from the combustion engine E flowing towards the neighborhood of the ignition switch 16 around the gap between the side fairing 30 and the air cleaner 36 can be effectively prevented by the second heat shielding member 37.

Moreover, the first heat shielding member 35 shown in FIG. 5 is engaged in the recess 37a defined in the front end portion of the second heat shielding member 37, and therefore, positioning between the first heat shielding member 35 and the second heat shielding member 37 is accomplished accurately. As a result thereof, the gap existing between the first and second heat shielding members 35 and 37 can be eliminated and, therefore, the heat shielding effect around the ignition switch 16 is further enhanced.

In addition, the front portion of the air cleaner 36 shown in FIG. 2 is provided with the sub intake port 42, forming a portion of the intake port, so as to be exposed to the outside and the second heat shielding ember 37 is positioned above the sub intake port 42. Accordingly, flow of rain water into the sub intake port 42 can be prevented by the second heat shielding member 37.

Since each of the first and second heat shielding members 35 and 37 is made of the sponge material, they can be easily fitted to predetermined site without adding a weight loading to the motorcycle.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Main frame
3 . . . Head pipe
16 . . . Ignition switch
30 . . . Side fairing (Cowling)
35 . . . First heat shielding member
35D . . . Part of the first heat shielding member (Sealing piece)
36 . . . Air cleaner
37 . . . Second heat shielding member
38 . . . Third heat shielding member
100 . . . Heat
E . . . Combustion engine

What is claimed is:

1. A motorcycle comprising:
a main frame having a front portion to which a head pipe is connected;
a combustion engine;
a cowling to cover an outer side of at least a front portion of the combustion engine;
an ignition switch disposed above the combustion engine and in the rearward neighborhood of the head pipe; and
a first heat shielding member configured to cover at least a rear face and opposite side faces of the ignition switch to shield a heat raising upwardly from the combustion engine, wherein:
the ignition switch is disposed above the main frame; and
a part of the first heat shielding member seals between the ignition switch and the main frame.

2. A motorcycle comprising:
a main frame having a front portion to which a head pipe is connected;
a combustion engine;
a cowling to cover an outer side of at least a front portion of the combustion engine;
an ignition switch disposed above the combustion engine and in the rearward neighborhood of the head pipe, the ignition switch being disposed above the main frame;
a first heat shielding member configured to cover at least a rear face and opposite side faces of the ignition switch to shield a heat raising upwardly from the combustion engine;
an air cleaner provided rearwardly of the ignition switch; and
a second heat shielding member configured to cover a gap between the ignition switch and the air cleaner and a gap between the main frame and the air cleaner.

3. The motorcycle as claimed in claim 2, in which a front portion of a side surface of the air cleaner is covered by the cowling, and the second heat shielding member is interposed between the air cleaner and the cowling.

4. The motorcycle as claimed in claim 2, in which the first heat shielding member is engaged in a recess defined in a front end portion of the second heat shielding member.

5. The motorcycle as claimed in claim 2, in which the air cleaner further comprises a sub intake port forming a part of an intake port, the sub intake port being provided in a front portion of the air cleaner so as to be exposed to the outside; and
the second heat shielding member is positioned above the sub intake port.

6. The motorcycle as claimed in claim 2, in which the first and second heat shielding members are made of a sponge material.

* * * * *